United States Patent [19]

Filippone

[11] Patent Number: 4,924,221
[45] Date of Patent: May 8, 1990

[54] REMOTE OIL TANK DISPLAY APPARATUS

[76] Inventor: Andrew Filippone, 20 LakeView Ave., Wakefield, Mass. 01880

[21] Appl. No.: 279,512

[22] Filed: Dec. 5, 1988

[51] Int. Cl.⁵ .................. G08C 19/04; G01F 23/00
[52] U.S. Cl. .................. 340/870.38; 340/870.09;
340/870.16; 340/612; 340/618; 340/623;
340/624; 340/625; 73/313; 73/317; 73/319;
116/110; 116/229; 338/33
[58] Field of Search ............ 340/870.38, 870.01,
340/870.07, 870.09, 870.16, 870.30, 603, 612,
618, 623, 624, 625; 116/109, 110, 227-229;
73/290 R, 290 B, 291, 301, 304 R, 305,
306-308, 317, 319, 322, 322.5, 313; 200/84 R,
190, 230; 307/118; 361/178; 338/33

[56] References Cited
U.S. PATENT DOCUMENTS 2,756,410  3/1952  Tobias .......................... 340/625
3,636,510  1/1972  Winfield ........................ 340/618
4,461,175  7/1984  Baumgart et al. ............. 340/618
4,724,705  2/1988  Harris ............................ 73/313

Primary Examiner—Donald J. Yusko
Assistant Examiner—Tyrone Queen
Attorney, Agent, or Firm—Leon Gilden

[57] ABSTRACT

A remote oil tank display apparatus is set forth in combination with an oil tank for the indication of oil tank volume. The sending unit is encased in a hermetically sealed container to prevent oil fume propagation throughout an area. A combination digital and light emitting diode display is set forth and is remotely positioned relative to the oil tank to enable individuals of diminished physical capacity to receive and display information of oil volume remaining in an oil tank. Further, an audio means may be selectively employed in concert with the visual displays to assist individuals of diminished hearing capacity.

1 Claim, 3 Drawing Sheets

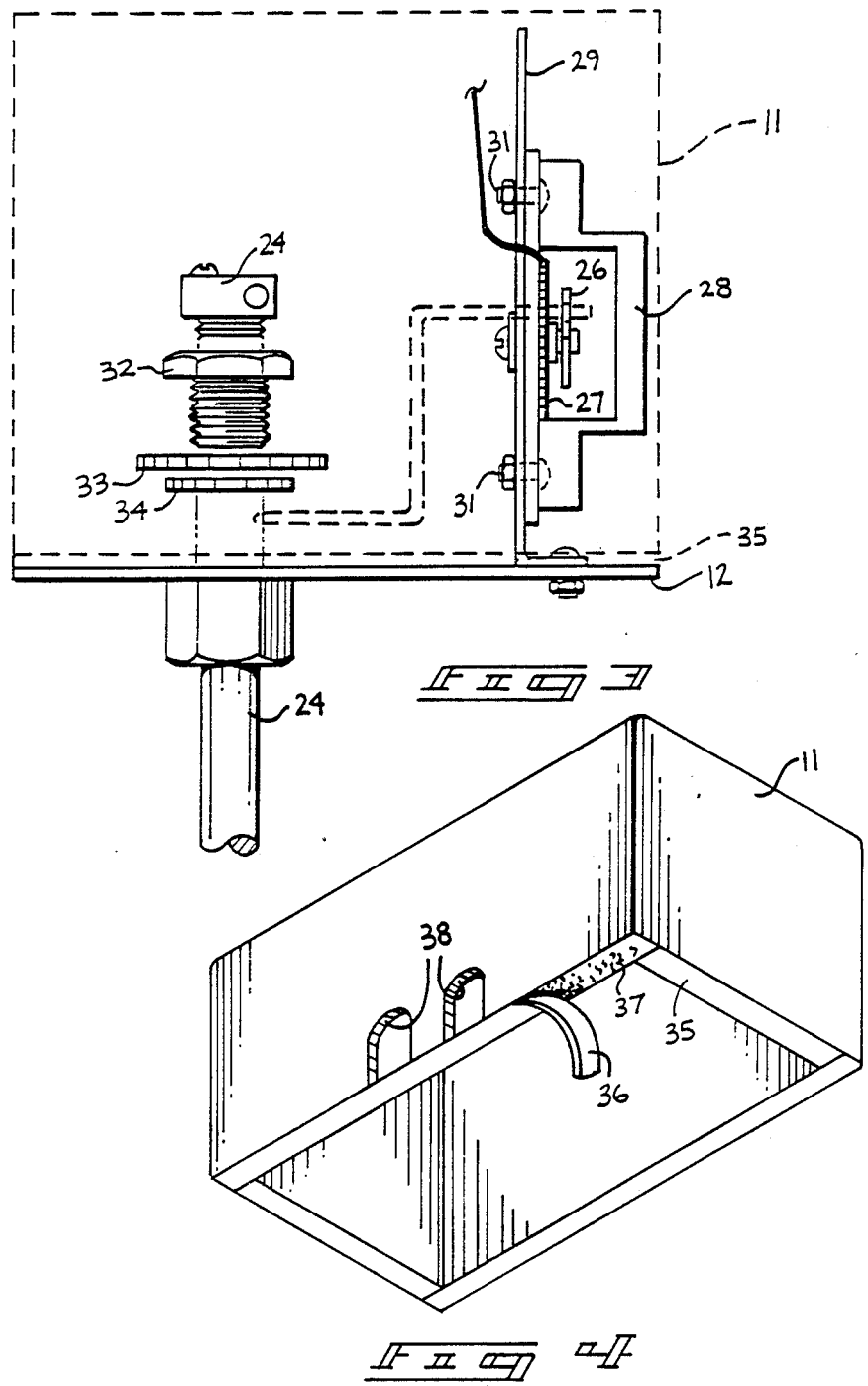

REMOTE OIL TANK DISPLAY APPARATUS

BACKGROUND OF THE INVENTION

1. Field of the Invention

The field of invention relates to sending units, and more particularly pertains to a new and improved remote oil tank display apparatus to provide at-a-glance determination of oil volume remaining within an oil tank.

2. Description of the Prior Art

The use of sending units is well known in the prior art, however these units are normally associated with portable or mobile tanks, such as gasoline tanks within motor vehicles. The instant invention utilizes a remote oil tank volume display powered by a typical direct current battery source step-down transformer to provide visual indication of oil volume within an oil tank. Prior art devices have failed to address the problem of oil tank volume display units wherein individuals of diminished capacity are at a disadvantage in attempting to ascertain the remaining volume of oil existing within an oil tank. For example, U.S. Pat. No. 2,197,636 to Faus sets forth a metering system utilizing a rheostat device for indication of fluid level within a container. The Faus patent is typical of metering systems for fluid containers.

U.S. Pat. No. 2,756,410 to Tobias sets forth a further fuel gauge and circuitry therefore to provide remote indication of fuel level, but as in other prior devices is provided with a constant supply of electrical power during operation of an associated motor vehicle and accordingly does not provide the selective use of the gauge as does the instant invention in use of a spring actuated switch to normally maintain an open circuit until indication of fuel level is desired by a user.

U.S. Pat. No. 4,290,059 to Noyes sets forth a liquid indicating level for use with a fuel storage tank wherein a magnetic switch upon descending to a relatively empty indicating position actuates a remote alarm for alert.

U.S. Pat. No. 4,386,387 to Todd sets forth a fluid indicator sensor wherein an electrically conductive float is disposed within an encapsulator and is responsive to the fluid level to provide indication. The Todd patent, as in other prior art, fails to provide the details of construction as set forth by the instant application of the instant invention particularly defining a hermetically enclosing housing positioned in sealing engagement of the fuel storage tank and further including a spring-biased switch to actuate an indicator only upon manually depressing the associated switch.

U.S. Pat. No. 4,571,998 to Stegner sets forth an LED dIsplay of fuel level within in-ground fuel tanks, but as in other prior devices is in a constantly energized state as opposed to the instant invention to provide indication of fuel level only upon actuation of a spring-biased plunger switch.

As such, there continues to be a need for a new and improved remote oil tank display apparatus which addresses both the problem of adaptability to existing units and ease of use, and in this respect the present invention substantially fulfills this need.

SUMMARY OF THE INVENTION

In view of the foregoing disadvantages inherent in the known types of fluid level displays now present in the prior art, the present invention provides a remote oil tank display apparatus wherein the same provides a digital and analog display of an oil tank fluid level upon actuation of a plunger switch. As such, the general purpose of the present invention, which will be described subsequently in greater detail, is to provide a new and improved remote oil tank display apparatus which has all the advantages of the prior art fluid level indicator apparatus and none of the disadvantages.

To attain this, the present invention utilizes a housing to hermetically seal a sending unit positioned within a storage oil tank electrically associated with a remote spring switch to momentarily actuate the indicator utilizing both a digital and analog display.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved remote oil tank display apparatus which has all the advantages of the prior art oil tank display apparatus and none of the disadvantages.

It is another object of the present invention to provide a new and improved remote oil tank apparatus which may be easily and efficiently manufactured and marketed.

It is a further object of the present invention to provide a new and improved remote oil tank apparatus which is of a durable and reliable construction.

An even further object of the present invention is to provide a new and improved remote oil tank apparatus which is susceptible of a low cost of manufacture with regard to both materials and labor, and which accordingly is when susceptible of low prices of sale to the consuming public, thereby making such remote oil tank apparatus economically available to the buying public.

Still yet another object of the present invention is to provide a new and improved remote oil tank apparatus which provides in the apparatuses and methods of the prior art some of the advantages thereof, while simultaneously overcoming some of the disadvantages normally associated therewith.

Still another object of the present invention is to provide a new and improved remote oil tank apparatus wherein the same may be positioned relative to an existing oil tank and momentarily actuated for instantaneous analog and digital display of fluid level within an existing oil tank.

These together with other objects of the invention, along with the various features of novelty which characterize the invention, are pointed out with particularity in the claims annexed to and forming a part of this disclosure. For a better understanding of the invention, its operating advantages and the specific objects attained by its uses' reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view taken in elevation of the sending unit of the instant invention.

FIG. 4 is an isometric illustration of the housing of the instant invention illustrating the sealing arrangement provided thereon.

DESCRIPTION OF THE PREFERRED EMBODIMENT

Figure 1:
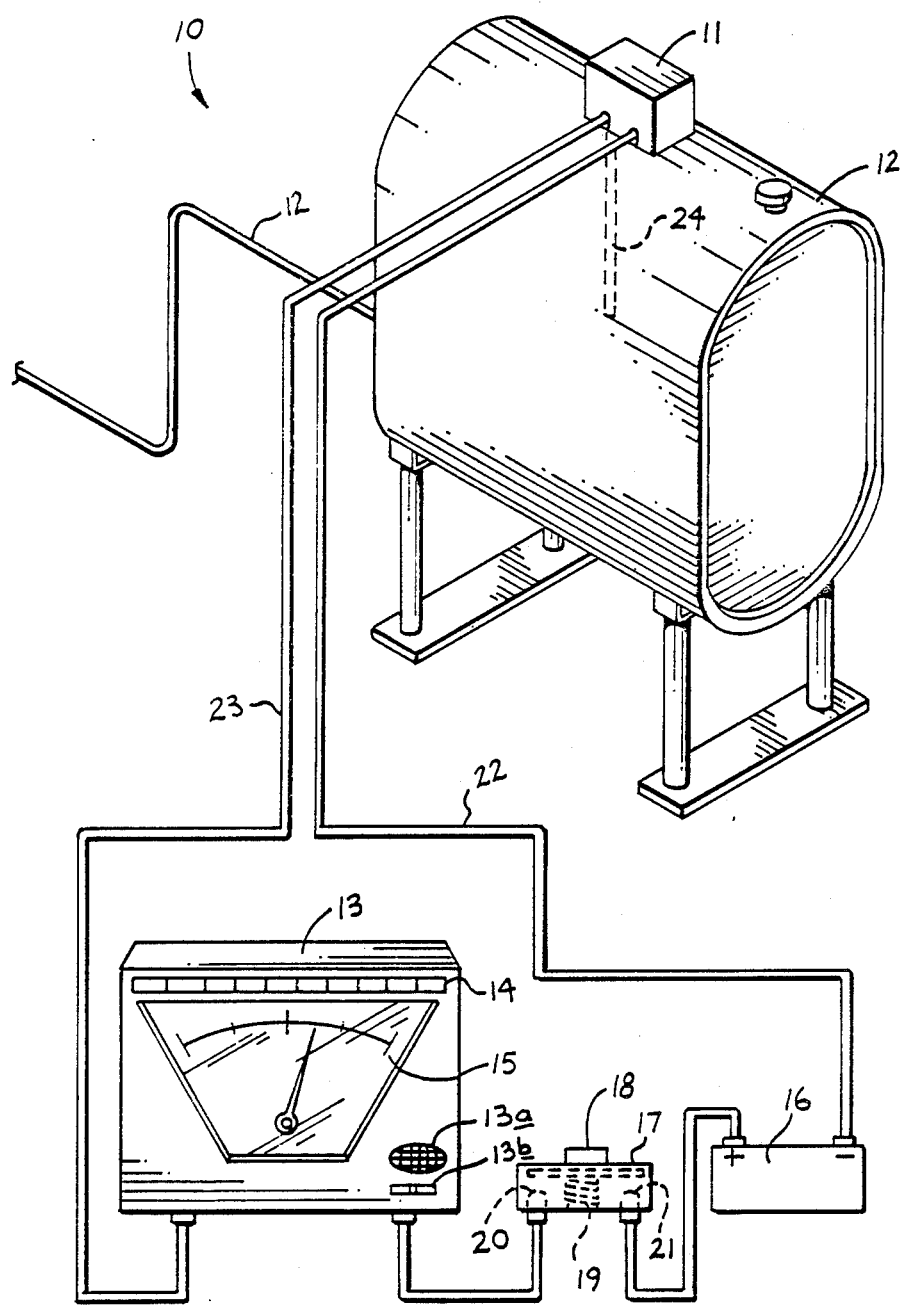
FIG. 1 is an isometric illustration of the instant invention.

With reference now to the drawings, and in particular to FIGS. 1 to 4 thereof, a new and improved remote oil tank display apparatus embodying the principles and concepts of the present invention and generally designated by the reference numeral 10 will be described.

More specifically, it will be noted that the remote oil tank display apparatus 10 essentially comprises a sealed housing 11 fixedly secured over the sending unit of the instant invention wherein the housing ii is sealingly secured to a conventional oil tank 12 provided with a typical outlet ply conduit 12a. A display unit 13 including a digital display 14 comprised of light emitting diodes (LED) and a companion analog display 15 of a conventional sweep dial configuration. A battery 16 supplies power to operate the remote display unit 13 that is actuated by means of a normally open switch 17 provided with a manual button 18 and normally biased to an open position by included spring 19 within the switch 17. Depressing of the manual button 18 provides continuity between the first and second electrical contacts 20 and 21 to complete the circuit and activate the dIsplay unit 13. A first and second electrical transmission line 22 and 28 electrically associated the battery, the switch, the display unit 13, and the sending unit of the instant invention.

A conventional audio source directing audio signals through speaker 13a is selectively utilized by means of switch 13b to provide an audio signal acting in concert with the visual displays of meters 14 and 15. Conventional audio synthesized computer chip circuitry could readily be utilized to achieve this desired result.

Figure 2:
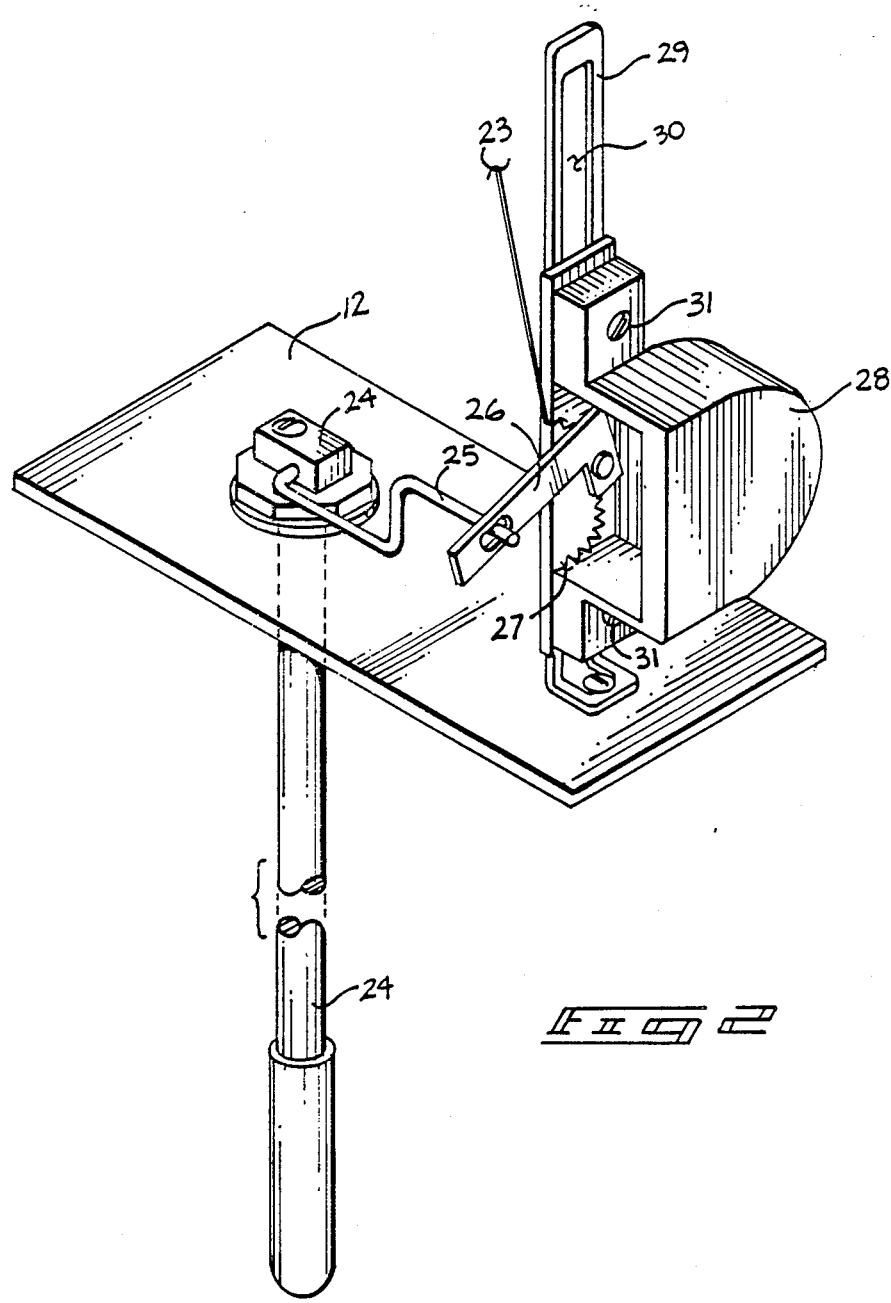
FIG. 2 is an isometric illustration of the sending unit of the instant invention.

FIG. 2 illustrates the sending unit of the Instant invention wherein a float arm 24 is immersed interiorly of tank 12 within the oil supply to provide indication of fluid volume within the tank and actuates a sender arm 26 through an angulated connector link 25. A rheostat unit 27 is positioned within the rheostat housing 28 and operates by the pivoting sender arm 26 pivoted interiorly of the housing 28 as illustrated.

An "L" shaped adjustment link- is fixedly secured to the tank 12 at a lower leg and is provided with an elongate slot 30 that adjustable secures the rheostat housing 28 to the link 29, as illustrated in FIG. 3 for example, by use of a plurality of connectors 31 to enable the housing 2B to adjustably accommodate variations in tank design and configuration and position the float arm 24 as required vertically.

A brass grommet 82 formed with a through-extending central bore accepts the float arm 24 slidingly therethrough wherein a metallic plate 33 is overlying a resilient sealing gasket 84 to sealingly secure the brass grommet 32 against the tank 12.

Reference to FIG. 4 illustrates the sealed housing 11 provided with a polymeric seal about a lower surface periphery of the housing 11 confronting the tank 12 wherein the polymeric seal is formed with a removable adhesive strip to expose an adhesive 37 wherein a plurality of slots 88 formed within the side wall of the housing 11 accommodates the first and second electrical transmission lines therethrough and wherein the slots 38 are of a diameter of complementary configuration to that of the transmission lines 22 and 28 such that when the housing 11 is secured to the tank 12, oil vapor that may pass outwardly from the brass grommet 82 remain confined within the housing 11 to prevent contamination of the surrounding environment.

In this manner, individuals may selectively depress the manual button 18 of the switch 17 to provide instantaneous indication of the fuel level within the oil tank 12 and wherein individuals with diminished capacity, including poor eyesight or dimly lit conditions, may further note the fuel supply within the tank 12 by the digital display 14 as well as the analog display 15. Since the use of energy from the associated storage battery 16 is limited to the length of time the button 18 is depressed, the life of the storage battery 16 is of an extended period.

It is understood that a conventional step-down transformer deriving power from house current could be substituted for the battery 16.

As to the manner of usage and operation of the instant invention, the same should be apparent from the above description and accordingly no further discussion relative to the manner of usage and operation of the instant invention shall be provided.

With respect to the above description then, it is to be realized that the optimum dimensional relationships for the parts of the invention, to include variations in size, materials. shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A remote oil tank display apparatus for use in combination with an oil storage tank comprising, in combination, an oil tank including a fluid indicating unit secured thereto, and a housing unit overlying said fluid indicating unit, and a display means for indicating fluid level within said oil tank in response to a fluid level signal generated from said fluid indicating unit;

a normally open switch means electrically associated in series with said fluid indicating unit, said display means, and a storage battery for providing electrical association between said fluid indicating unit and said display means, and wherein said switch means includes a spring normally biasing said switch means to an open position and further including a manually depressible button means for accepting manual displacement overcoming a force imposed by said spring to close said switch means to electrically associate said fluid indicating unit and said display means, and wherein the said display means includes an analog display and a digital display, and wherein said digital display comprises a series of light emitting diodes for indicating fluid level in said oil tank, and wherein said housing unit includes a resilient sealing member integrally secured about a lower peripheral surface of said housing unit and further including a removable adhesive flexible strip to enable adhesive securement of said housing unit to said oil tank and wherein said housing unit further includes a plurality of openings to accept electrical transmission lines to electrically associate the fluid indicating unit with said display means, and wherein said fluid indicating unit includes a float arm reciprocatably disposed within a brass grommet, said brass grommet includes a through-extending bore to slidingly accept said float arm therethrough and wherein said brass grommet is sealingly secured to said oil tank, and wherein said float arm is mechanically connected to a rheostat by an interconnecting angulated link to pivot a sender arm in response to fluid level within said oil tank, and wherein said rheostat is secured within a rheostat housing, and said rheostat housing is slidingly securable to an "L" shaped bracket, and said "L" shaped bracket includes an elongate slot for adjustably positioning said rheostat housing vertically with respect to said bracket.

* * * * *